US00RE34977E

United States Patent [19]

McCoy

[11] E Patent Number: Re. 34,977

[45] Reissued Date of Patent: Jun. 20, 1995

[54] MODULAR FURNITURE POWER DISTRIBUTION SYSTEM AND ELECTRICAL CONNECTION THEREFOR

[75] Inventor: Phillip A. McCoy, Laotto, Ind.

[73] Assignee: Pent Assemblies, Inc., Kendallville, Ind.

[21] Appl. No.: 138,202

[22] Filed: Oct. 20, 1993

Related U.S. Patent Documents

Reissue of:

[64] Patent No.: 5,104,332
Issued: Apr. 14, 1992
Appl. No.: 643,323
Filed: Jan. 22, 1991

[51] Int. Cl.[6] ..... H01R 23/27

[52] U.S. Cl. ..... 439/290; 439/215; 439/650; 439/907

[58] Field of Search ..... 439/207, 209–218, 439/221–224, 284, 290–295, 502, 505, 650–655, 907

[56] References Cited

U.S. PATENT DOCUMENTS

| | | | |
|---|---|---|---|
| 3,634,811 | 1/1972 | Teagno et al. | 439/290 |
| 3,644,872 | 2/1972 | Russo, Jr. | 439/907 |
| 3,841,042 | 10/1974 | Siegal | 52/282 |
| 4,060,294 | 11/1977 | Haworth et al. | 439/165 |
| 4,241,965 | 12/1980 | Wilson et al. | 439/31 |
| 4,367,370 | 1/1983 | Wilson et al. | 439/215 |
| 4,382,648 | 5/1983 | Propst et al. | 439/209 |
| 4,408,820 | 10/1983 | Eaby et al. | 439/52 |
| 4,688,869 | 8/1987 | Kelly | 439/121 |
| 4,781,609 | 11/1988 | Wilson et al. | 439/215 |
| 5,096,433 | 3/1992 | Boundy | 439/215 |
| 5,266,046 | 11/1993 | Bogiel | 439/290 |

*Primary Examiner*—Gary F. Paumen
*Attorney, Agent, or Firm*—Barnes & Thornburg

[57] ABSTRACT

A prewired electrical distribution member of the type utilized along movable partitions or similar modular furniture near the bottom edges thereof for distributing electrical energy and having like connectors at opposite ends thereof for connection to like member of an adjacent member is disclosed. Each member includes an elongated rigid central portion having a connector for receiving at least one electrical outlet centrally located therealong and flexible end portions permanently attached thereto. The flexible end portions enclose a plurality of conductors arranged in generally single file vertical alignment and have the connectors permanently fixed to their respective free ends. The connectors have both end and side terminal openings and are uniquely adapted to engage one another in any of an end to end, side to side, or end to side manner for effecting electrically insulating housing partially open at one end connections at corners. The connectors each have an and partially open along one side which is adapted to mate with the corresponding partially open portion of the housing of the other connector. A plurality of terminals are disposed within the housing with each terminal having a pair of contact blades with a gap therebetween and an adjacent single contact blade facing the partially open end as well as a pair of contact blades with a gap therebetween and an adjacent single contact blade facing the partially open side for engaging corresponding contact blades of a like terminal of the other connector when the connectors are interengaged.

7 Claims, 2 Drawing Sheets

MODULAR FURNITURE POWER DISTRIBUTION SYSTEM AND ELECTRICAL CONNECTION THEREFOR

Matter enclosed in heavy brackets [ ] appears in the original patent but forms no part of this reissue specification; matter printed in italics indicates the additions made by reissue.

SUMMARY OF THE INVENTION

The present invention relates generally to power distribution systems of the type which may be configured by the user without the need for tools nor the services of a professional electrician and more especially to such power distribution systems of the modular type which are frequently incorporated into or used in conjunction with prefabricated and prewired office partitions and similar furniture. In particular, the present invention provides unique electrical connectors for coupling sets of conductors in such power distribution systems and to terminals for such electrical connectors, and more specifically to electrical connectors and their terminals which are self-mating in the sense that one such terminal may be connected to another substantially identical terminal and in a plurality of different ways.

Prewired office partitions and similar modular furnishings with power and/or communications wiring running in raceways along the top or bottom of the partitions have been known for a number of years. The following U.S. Patents are exemplary, but by no means exhaustive of such modular electrical wiring arrangements. Prewired power systems for wall panels where power outlets or receptacles are positioned in predetermined fixed locations along a power raceway extending near the bottom of the panel, and jumper cables interconnect two or more such panels, again between predetermined locations along the raceways, are disclosed in the U.S. Pat. No. 4,060,294. A variation on the previous patent which allows a measure of selectability of one of multiple circuits extending through the raceway is shown in the U.S. Pat. No. 4,367,370. An improvement which allows positioning of the power outlets or receptacles at virtually any location along the power distribution system is shown in the U.S. Pat. No. 4,688,869. The U.S. Pat. No. 4,408,820 illustrates improvements in the terminals used to interconnect multiconductor conduit while providing a tap or connection to certain ones only of those conductors.

One recurrent problem in these prewired office partitions is forming an electrical connection between adjacent panels and particularly adjacent panels which are other than in straight alignment with one another. U.S. Pat. Nos. 3,841,042; 4,241,965; and 4,382,648 illustrate various attempts to overcome this corner connection problem. The U.S. Pat. No. 3,841,042 suggests, in FIG. 8, an extension cord solution. The U.S. Pat. No. 4,241,965 discloses a hinge structure which includes a passageway not unlike a portion of a revolving door through which interconnecting wires may pass. The U.S. Pat. No. 4,382,648 suggests relatively rigid preformed matable connectors which are either straight or right angled. A compatible flexible connection is also provided for oblique interconnection. Each of these solutions suffers from one or more of the following defects: failure to meet modern electrical code requirements; a lack of ease arid versatility of assembly; failure to be completely enclosed within the wall structure; a consumption of excess space; and excessive cost and complexity.

Among the several objects of the present invention may be noted the elimination of each of the previous defects; the provision of a pair of [interengagable] *interengageable* terminals having multiple modes of connection; the provision of a self-mating connector and terminal therefor: the provision of a self-mating connector which may be coupled to a like connector in any of several different ways including at least two different angular orientations; and the provision of a self-mating corner connector for effecting straight through or right angle connections in any combination. These as well as other objects and advantageous features of the present invention will be in part apparent and in part pointed out hereinafter.

In general, each of a pair of [interengagable] *interengageable* connectors for coupling respective ones of a first set of conductors to corresponding ones of a second set of conductors has an electrically insulating housing partially open at one end and adapted to mate with the corresponding partially open end of the housing of the other connector along with a plurality of terminals within each of the housings. The terminals each have a pair of contact blades with a gap therebetween facing the partially open end of the housing for receiving one contact blade of a like terminal of the other connector when the connectors are [interengaged] *interengaged*. Sets of conductors extend into the housings and are connected to corresponding terminals within the housings. Each terminal is formed from a single piece of resilient conductive material and has an arrangement near one end of a base portion for receiving and crimping to a conductor. Each connector includes a conductive central portion and conductive first connection means extending from the central portion in a first direction and comprising first male and female portions extending parallel to each other in the first direction and spaced a predetermined distance apart in a second direction perpendicular to the first direction, with the male portion on a predetermined side of the female portion as well as conductive second connection means extending from the central portion in the second direction and comprising second male and female portions extending parallel to each other in the second direction and spaced said predetermined distance apart in said first direction, and with the second male portion on said predetermined side of the female portion, whereby the male and female portions of either one of the first and second connection means on one of said connectors can interfit and make good electrical contact with the female and male portions respectively of either one of the first and second connection means of a second one of said connectors. Each male portion may include a conductive bar of predetermined thickness in a direction generally perpendicular to both the first and second directions, and each female portion may include first and second conductive strap members defining a tapered entrance more narrow than the thickness of the bar to receive a male portion of another of said connectors and make firm electrical connection therewith, and joining means joining the strap members together to hold them in predetermined spaced relationship. Typically, the entrance between each pair of conductive strap members has a central plane which passes through the center of the bar of the male portion alongside the pair of strap members.

Also in general and in one form of the invention, a prewired electrical distribution member is adapted to extend along a movable partition or the like near the bottom edge thereof for distributing electrical energy and has like connectors at its opposite ends for connection with a like member of an adjacent movable partition. Each member includes an elongated rigid central portion having an arrangement for receiving at least one electrical outlet centrally located therealong and flexible end portions permanently attached to the rigid central portion with the flexible end portions having the connectors at their respective free ends. The rigid central portion comprises a metal channel with a plurality of conductors extending from one connector to the other through the respective flexible end portions and the metal channel. The plurality of conductors are arranged in generally single file vertical alignment within the respective flexible end portions and the flexible end portions include a sheath of a generally uniform thickness molded over the single file conductors. The sheath is relieved along a series of lines generally orthogonal to the wires to facilitate bending, particularly into a generally serpentine pattern to effectively foreshorten the separation between successive rigid portions.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
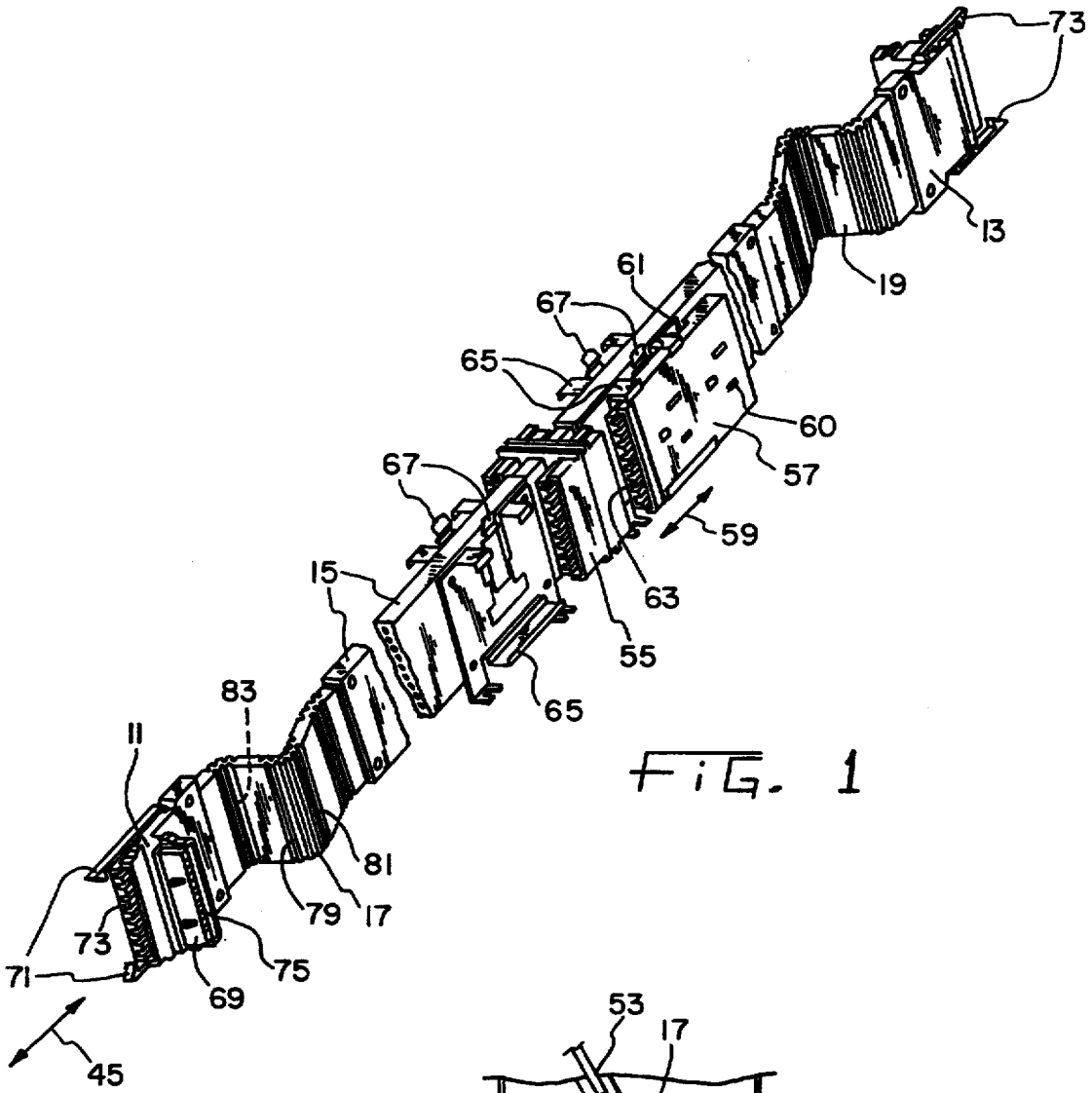
FIG. 1 is a perspective view of a prewired electrical distribution member incorporating the present invention in one form.
Figure 2:
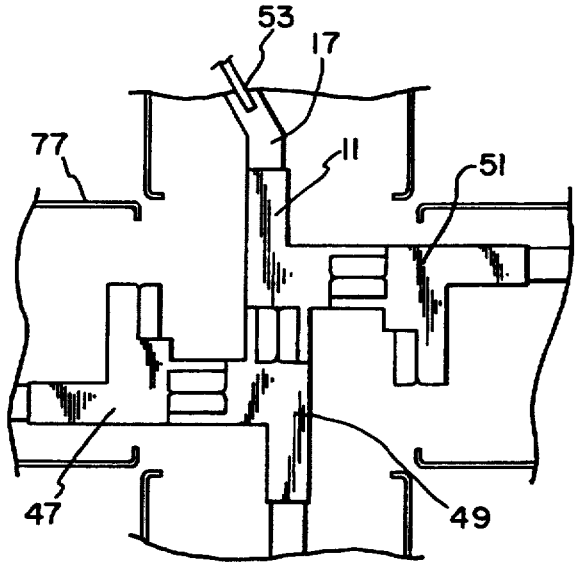
FIG. 2 is a top plan view of the junction between orthogonal wall panels showing one of several possible electrical connector interconnections.
Figure 3:
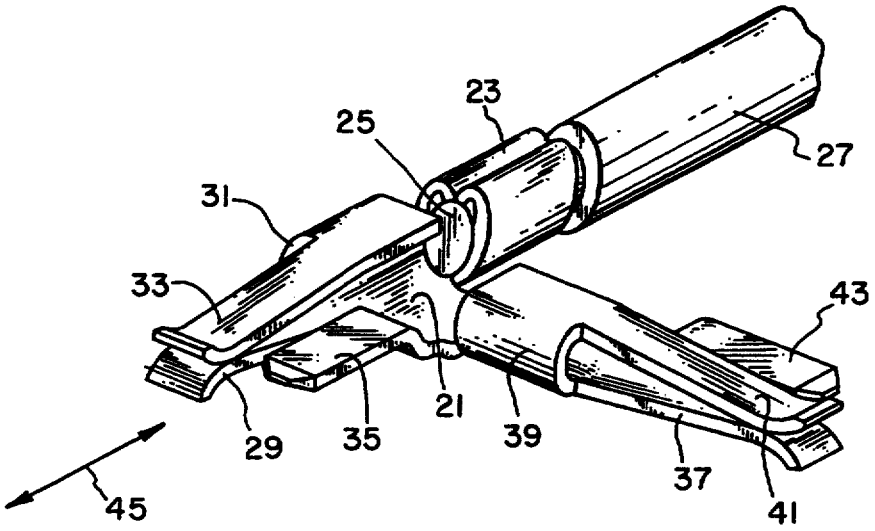
FIG. 3 is a perspective view of a self-mating, two-way electrical terminal.

The prewired distribution member of FIG. 1 is typically positioned to extend along the bottom edge of a movable partition or the like for distributing electrical energy and has like connectors 11 and 13 at opposite ends thereof for connection to a like or similar member of an adjacent movable partition. Each distribution, member includes an elongated rigid central portion 15 having means for receiving at least one electrical outlet centrally located therealong and flexible end portions 17 and 19 permanently attached thereto. The flexible end portions 17 and 19 have the connectors 11 and 13 at their respective free ends. Each of these connectors 11 or 13 has the option of connecting to a like connector end to end in a generally straight line or at about a right angle as shown in FIG. 2, and each of these connectors includes a plurality (eight as illustrated) of like terminals an illustrative one of which is shown in FIG. 3. The FIG. 2 behavior is best understood by first considering FIG. 3.

Figure 4:
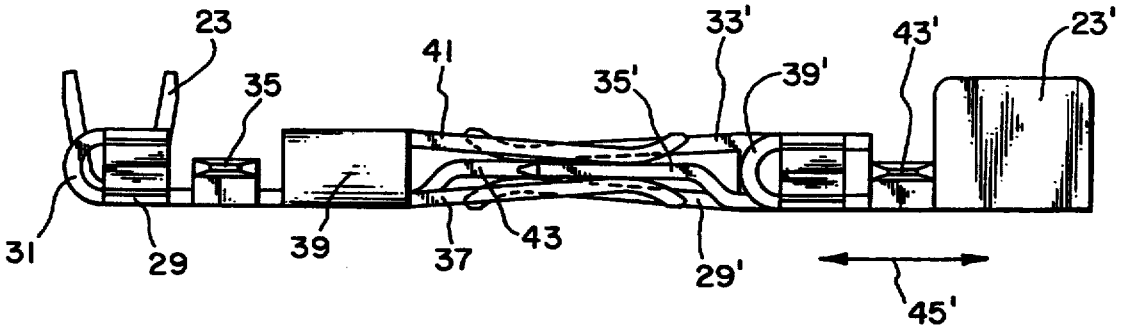
FIG. 4 is a side elevation view of the terminal of FIG. 3 interengaged with a substantially identical second terminal.

The terminals of FIGS. 3 and 4 are preferably made from a highly conductive resilient material having good stress relaxation resistance at elevated temperatures, thereby providing high amperage capabilities. For example, Olin Brass alloy #1, a zirconium copper having 99.9% copper and 0.1% zirconium has been found suitable. This material has fairly good spring characteristic and is much more conductive than the brass alloys conventionally used for terminal blades.

Referring in particular to FIG. 3, a conductive electrical terminal is formed from a single piece of resilient conductive material such as the aforementioned alloy and includes a conductive central or base portion 21, a U-shaped cup 23 near one base portion end for receiving and permanently connecting to the stripped conductive end 25 of insulated conductor 27. A first cantilevered blade 29 extends from the base portion 21 other end and a web portion 31 upstanding from the base portion intermediate the U-shaped cup 23 and the first cantilevered blade 29 supports a second cantilevered blade 33 which extends from the web portion generally parallel to and overlying the first cantilevered blade. Each cantilevered blade 29, 33 is bent toward and then away from the other cantilevered blade to provide between the blades an opening or female connection portion for slidingly receiving and gripping a male blade of another terminal. A third cantilevered blade as is located generally intermediate to and spaced laterally from the first and second cantilevered blades 29 and 33 and extends from the base portion 21 in a direction generally parallel to the first and second cantilevered blades. The third cantilevered blade 35 has major surfaces above and below which are parallel to a plane extending between the first and second cantilevered blades 29 and 33. The cantilevered blades 29 and terminate at respective free ends with the minimum separation therebetween occurring close to the respective blade free ends. This minimum separation is less than the thickness of the third cantilevered blade 35. A fourth cantilevered blade 37 extends from the base portion 21 intermediate the U-shaped cup 23 and the first cantilevered blade 29. A second web portion ;59 is Upstanding from the base portion 21 intermediate the web portion 31 and the fourth cantilevered blade 37. A fifth cantilevered blade 41 extends from the second web portion 39 generally parallel to and overlying the fourth cantilevered blade 37. As before, the fourth and fifth cantilevered blades are bent toward and then away from one another to provide therebetween an opening for slidingly receiving and gripping a blade of another terminal. Finally, a sixth cantilevered blade 43 is located generally intermediate to and spaced laterally from the fourth and fifth cantilevered blades 37 and 41 and extends from the base portion in a direction generally parallel to the fourth and fifth cantilevered blades. Each terminal thus has a female portion 29, 33 and a parallel male portion 35 extending in the same direction as the insulated conductor 27 as well as a like female portion 37, 41 and like male portion 43 extending parallel to the female portion 37, 41 and perpendicular to the direction of the conductor 27. Thus, a conductive first connection means extends from the central portion 21 in a first direction corresponding to the direction of arrow 45 in FIG. 3 and comprises first male 35 and female 29, 33 portions extending parallel to each other in the first direction and spaced a predetermined distance apart in a second direction perpendicular to the first direction. The male portion 35 is located on a predetermined side of the female portion. The cantilevered blades 37, 41 and 43 constitute a conductive second connection means extending from the central portion 21 in a second direction preferably about perpendicular to the first direction. This second connection means comprises second male and female portions extending parallel to each other in the second direction and spaced said predetermined distance apart in said first direction, and with the second male portion 43 on said predetermined side of the female portion, whereby the male and female portions of either one of the first and second connection means on one of said connectors can interfit and make good electrical contact with the female and male portions respectively of either one of the first and second connection means of a second one of said connectors. Each male portion 35 or 43 comprises a conductive bar having a predetermined thickness in a direction generally perpendicular to both the first and second directions; and each female portion comprises first and second conductive strap members 29, 33, 37 and 41 which define a tapered entrance more narrow than the thickness of the bar to receive a male portion of another of said connectors and make firm electrical connection therewith. The webs 31 and 39 function to join the strap members together to hold them in predetermined spaced relationship. Thus, either of the parallel male-female portions may be directly [interengaged] *interengaged* with either one of a like set of parallel male-female portions of a like terminal.

In FIG. 4, a pair of substantially identical terminals are [interengaged] *interengaged* to form an electrical connection between a pair of conductors. Correspondingly primed reference numbers are used to identify like portions of the right terminal. It will be noted that the second or laterally extending connection means of the left terminal is mated with the first connection means (the one extending in the direction of arrow 45') of the right terminal. It will also be noted that the U-shaped cups 23 and 23' are open and ready to receive corresponding conductors rather than being crimped about the conductors as in FIG. 3. Each terminal has a pair of superposed elongated generally flat blades such as 37 and 41 defining a gap for yieldingly receiving the flat or planar male blade such as 35' of the other terminal. At the same time and rearward of those just described, the male connector 43 of the left terminal is inserted between blades 29' and 33' of the right terminal. These two terminals could, of course, be joined by either set of blades on either terminal, or in a total of four different ways.

FIG. 2 shows four like [interengagable] *interengageable* connectors 11, 47, 49 and 51 within portions of wall panels such as 77 for coupling respective ones of a first set of conductors, say 53, to corresponding ones of the other three sets of conductors. Connectors 11 and 49 are connected end to end in a straight through manner. Connectors 11 and 51 are connected side to end to effect a right angle turn. Connectors 47 and 49 are connected end to side to effect a right angle turn. Each connector is substantially like the connector 11 shown in FIG. 1. Each connector includes an electrically insulating housing 69 partially open at end 73 and along one side at 75. The end and side openings are adapted to mate with the corresponding partially open end or side of the housing of another connector. Each connector has a plurality of terminals like those shown in FIGS. 3 and 4 to effect electrical connections either at the end in the direction of arrow 45 or at the side in a direction generally perpendicular to arrow 45 as described earlier. Within the housing each terminal has; as described earlier, pairs of contact blades with gaps therebetween facing both the partially open end and partially open side for receiving one contact blade of a like terminal of the other connector when the connectors are [interengaged] *interengaged*. Moreover, each terminal has male blades facing both the partially open end and partially open side for entering the gap between corresponding pairs of contact blades of a like terminal of the other connector when the connectors are [interengaged] *interengaged*. A set of conductors such as 53 extend into each of the housings within flexible portions such as 17 and each conductor is connected to a corresponding terminal within the housing in the manner shown in FIG. 3.

Figure 5:
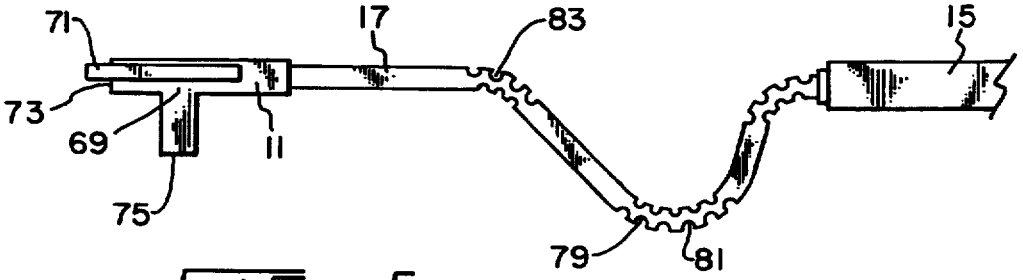
FIG. 5 is a top plan view of one corner connector and the adjacent flexible end portion of the electrical distribution member.

Returning to FIG. 1, each electrical distribution member includes the elongated rigid metal channel portion 15 with an arrangement such as the connector 55 for receiving one or more electrical outlets centrally or near the ends thereof as well as the flexible end portions 17 and 19 which are permanently attached to the central portion. The flexible end portions have the connectors 11 and 13 at the respective free ends thereof. A plurality of conductors extend from one connector to the other through the respective flexible end portions and the metal channel. These conductors are arranged in generally single file vertical alignment within the respective flexible end portions, and the flexible end preferably comprising a sheath of a generally uniform thickness molded over the single file conductors. As best seen in FIG. 5, the sheath is relieved along a series of transverse lines such as 79, 81 and 83 which lines extend generally orthogonal to the wires to facilitate bending thereof allowing the flexible end portions to assume a serpentine pattern to effectively foreshorten that portion to accommodate and mate with an adjacent connector no matter where, within a range of distances, that adjacent connector may be.

In FIG. 1, a portion of a modular wiring system is seen to include a multicircuit connector 55 into which a power outlet tap or receptacle 57 of the modular wiring system may be moved longitudinally generally in the direction of arrow 59 into and out of engagement with the connector 55. The direction of arrow 89 is substantially the same as the direction of elongation of the elongated rigid central portion 15 of the distribution member. The terminals within the connector 55 and tap 57 may be similar to those shown in FIGS. 3 and 4 without, however, the second connection means 37, 41 and 43, or may be of other known types. The tap 57 includes a conventional plug receptacle in faceplate 61 for transversely slidingly receiving a conventional plug. The multicircuit connector 55 provides potential connection to a plurality of independent power circuits, it being noted that there are eight notches along the opening 63 for eight corresponding conductor terminals. In the presently preferred embodiment, there may be four separate line conductors, two separate ground conductors and two separate neutral conductors with two line, one ground and one neutral forming a power circuit independent of the power circuit of the others. The tap 57 provides an electrical connection between a selected one of these power circuits and the conventional electrical plug receptacle.

The modular wiring system may include a metal guide track 65 for aligning the tap 87 longitudinally along the direction of arrow 59 with the multicircuit connector 55. As depicted in FIG. 1, the guide track 68 and the tap or outlet 57 include cooperating latching arrangements in the form of spring 67 formed integral with the metal guide track 65 and a notch 69 on the back side of the tap for retaining the tap in engagement with the multicircuit connector. Alternative latching arrangements such as cantilevered locking tabs similar to the tabs 71 and 73 shown on the connectors 11 and 13 and mating notches on the connector 55 may, of course, be used to retain the tap and connector in engagement.

From the foregoing, it is now apparent that a novel self-mating connector and self-mating terminal therefor having been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A conductive electrical terminal formed from a single piece of resilient conductive material comprising:

a base portion;

[a U-shaped crimp cup near one end of the base portion for receiving and permanently crimping to a conductor;]

a first cantilevered blade extending from [another] *an* end of the base portion;

a web portion upstanding from the base portion [intermediate the U-shaped cup and the first cantilevered blade];

a second cantilevered blade extending from the web portion generally parallel to and overlying the first cantilevered blade;

each cantilevered blade being bent toward and then away from the other cantilevered blade to provide between the blades an opening for slidingly receiving and gripping a blade of another terminal; and a third cantilevered blade located generally intermediate to and spaced laterally from the first and second cantilevered blades and extending from the base portion in a direction generally parallel to the first and second cantilevered blades, the third blade having major surfaces which are parallel to a plane extending between the first and second blades.

2. The conductive electrical terminal of claim 1 wherein the cantilevered blades terminate at respective free ends, the minimum separation between the first and second cantilevered blades occurring close to the respective blade free ends, the minimum separation being less than the thickness of the third cantilevered blade.

3. The conductive electrical terminal of claim 1 further comprising:

a fourth cantilevered blade extending from the base portion [intermediate the U-shaped cup and the first cantilevered blade];

a second web portion upstanding from the base portion intermediate the web portion and the fourth cantilevered blade;

a fifth cantilevered blade extending from the second web portion generally parallel to and overlying the fourth cantilevered blade;

the fourth and fifth cantilevered blades being bent toward and then away from one another to provide between the blades an opening for slidingly receiving and gripping a blade of another terminal; and a sixth cantilevered blade located generally intermediate to and spaced laterally from the fourth and fifth cantilevered blades and extending from the base portion in a direction generally parallel to the fourth and fifth cantilevered blades.

4. In a wiring system for modular room dividers and the like, a one-piece connector comprising:

a conductive central portion;

[conductive wire receiving means conductively connected to the central portion to engage an end of a wire conductor;]

conductive first connection means extending from the central portion in a first direction and comprising first male and female portions extending parallel to each other in the first direction and spaced a predetermined distance apart in a second direction perpendicular to the first direction, with the male portions on a predetermined side of the female portion; and conductive second connection means extending from the central portion in the second direction and comprising second male and female portions extending parallel to each other in the second direction and spaced said predetermined distance apart in said first direction, and with the second male portion on said predetermined side of the female portion, whereby the male and female portions of either one of the first and second connection means on one of said connectors can interfit and make good electrical contact with the female and male portions respectively of either one of the first and second connection means of a second one of said connectors.

5. The connector of claim 4 in which each male portion comprises a conductive bar having a predetermined thickness in a direction generally perpendicular to both the first and second directions; and each female portion comprises first and second conductive strap members: defining a tapered entrance more narrow than the thickness of the bar to receive a male portion of another of said connectors and make firm electrical connection therewith, and joining means joining the strap members together to hold them in predetermined spaced relationship.

6. The connector of claim 5 in which the entrance between each pair of conductive strap members has a central plane which passes through the center of the bar of the male portion alongside the pair of strap members.

7. A pair of [interengagable] *interengageable* connectors for coupling respective ones of a first set of conductors to corresponding ones of a second set of conductors, each connector comprising:

an electrically insulating housing partially open one end and partially open along one side, the end and side being generally perpendicular to one another and adapted to mate with the corresponding partially open end or side of the housing of the; other connector;

a plurality of one-piece terminals within the housing each having a first set of contact blades comprising a pair of contact blades with a gap therebetween and an adjacent single contact blade facing the partially open end and each having a second set of contact blades comprising a pair of contact blades with a gap therebetween and an adjacent single contact blade facing the partially open side, either of said first and second sets of contact blades adapted to engage corresponding contact blades of a like terminal of the other connector when the connectors are [interengaged; and a set of conductors extending into the housing with each conductor connected to a corresponding terminal within the housing] *interengaged.*

* * * * *